March 6, 1956    E. S. ROBERTS ET AL    2,737,440
MANUFACTURE OF SODA ASH
Filed Sept. 11, 1951
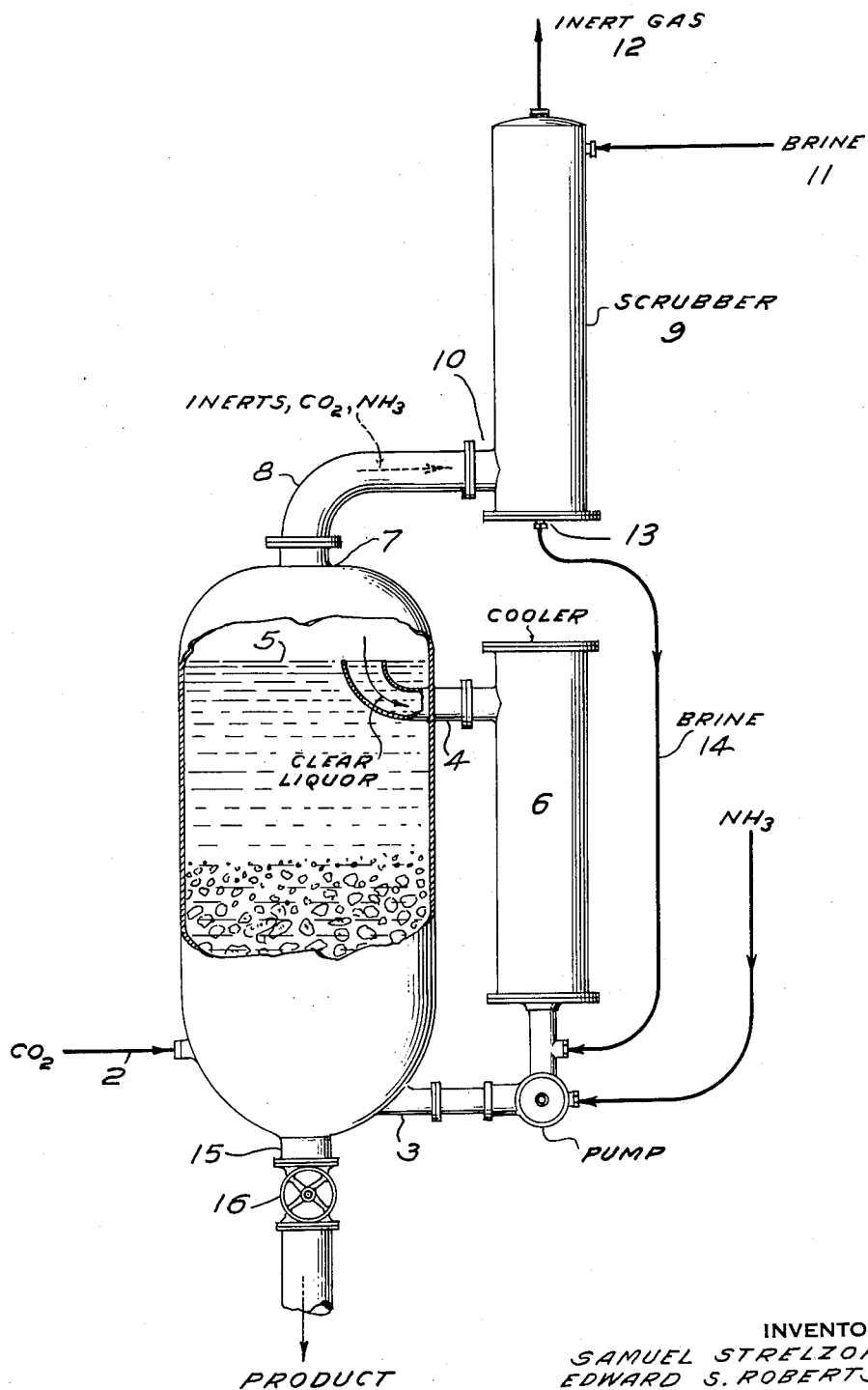
INVENTORS
SAMUEL STRELZOFF,
EDWARD S. ROBERTS,
BY
ATTORNEY

United States Patent Office 2,737,440
Patented Mar. 6, 1956

2,737,440

MANUFACTURE OF SODA ASH

Edward S. Roberts and Samuel Strelzoff, New York, N. Y., assignors to Chemical Construction Corporation, New York, N. Y., a corporation of Delaware Application September 11, 1951, Serial No. 246,092

2 Claims. (Cl. 23—63)

This invention relates to a method of producing soda ash. More specifically, it is concerned with that stage of the method of producing soda ash in which sodium bicarbonate is precipitated by carbonating an ammoniated brine solution. Still more specifically it relates to a novel method of conducting this reaction and of controlling the crystal growth of the precipitated sodium bicarbonate.

Perhaps the most common process employed for carbonating an ammoniated brine solution involves the use of a so-called "Solvay" carbonating tower. Such a tower is usually quite tall and his disposed therein a plurality of horizontal shelves. Ammoniated brine solution is introduced at the top of the tower, carbon dioxide gas at the bottom. This provides a counter-current flow of the two reactants through the tower, resulting in the absorption of the gases forming ammonium bicarbonate, and the subsequent reaction thereof with the sodium chloride to form sodium bicarbonate.

This reaction in which sodium bicarbonate is formed is exothermic. Accordingly, some heat removal means must be associated with the reaction tower. This, generally, comprises a plurality of coils, usually within the tower through which cooling water is circulated. Due to the slow movement of the liquor downwardly through the tower, however, these coils gradually become incrusted with bicarbonate. As a result, the heat transfer becomes increasingly more difficult.

Nevertheless, to insure successful operation of this reaction, it is necessary to accurately control the reaction temperature. Because of the incrustation problem, it has become the usual practice to use a plurality of carbonating towers. By this arrangement, towers may be alternately employed and each tower may be successively cleaned, every few days, of the undesirable incrustation. In this manner incrustation on heat transfer coils of the operating towers can be maintained within the limits necessary to insure proper heat transfer.

Although such a procedure permits accurate heat transfer in the carbonating towers, it creates a further serious problem. Each tower, when not in use as a carbonating tower, is employed to partially carbonate the ammoniated brine leaving the ammonia saturators. This partially carbonated ammoniated brine is an active solvent for the incrustations of bicarbonate and, accordingly, cleans the tower thereof. However, the flow of the brine through this tower is substantially faster than that through the carbonating towers which creates a new storage problem. Moreover, such a procedure as described greatly increases the initial investment of any plant.

A further disadvantage of the conventional process described is the fact that the reactants are introduced at the extreme ends of the tower. Thus the reactants are flowing counter-currently. This inevitably results in a certain part of the free ammonia entering with the ammoniated brine solution being swept out of the tower by the inert gases which accompany the carbon dioxide introduced at the bottom of the tower. Such an arrangement does not favor the absorption of the ammonia and carbon dioxide and the subsequent conversion of the sodium chloride to bicarbonate.

A further disadvantage of the conventional process is the fact that the reactants are introduced into a suspension of bicarbonate which is not in equilibrium with all the other components. Thus, when an equilibrium is reached in the conventional design, it is at a point where no fresh ammonia is introduced. The only ammonia present at this point is that which remains after completion of the reaction. Consequently, the whole advantage of the highest ammonia partial pressure cannot be taken.

It is, therefore, the principal object of this invention to provide a novel process for the precipitation of sodium bicarbonate not subject to these limitations. Such a process should prevent incrustations on the heat exchange means and permit effective heat removal. It should also provide for a high conversion rate of the reactants. Preferably also, such a process should be capable of producing bicarbonate crystals of sufficiently large size to insure successful operation of subsequent phases of the chemical process.

Surprisingly, these objects have been met in a novel process which is not only effective but readily operated. In general, this process consists in first providing a large volume of slurry of crystals of sodium bicarbonate. Into this body of slurry near the bottom thereof carbon dioxide gas, ammonia and brine are introduced. Clear liquor from the top of the body of slurry is continually withdrawn, cooled by suitable means and then reintroduced into the body of slurry. Usually it is returned with the incoming brine and ammonia. Slurry containing crystals of the desired size is withdrawn from a point near the bottom of the body of slurry as product. A relatively very large body of slurry should be maintained. It should be large enough to provide a retention of the crystals for time sufficient to favor settling of sufficiently large crystals.

The specific details of the process will be more fully discussed with reference to the accompanying drawing. The drawing diagrammatically illustrates the reaction flows as carried out in one form of diagrammatically shown apparatus which may be employed in carrying out the process.

Referring to the drawing, reference numeral 1 indicates a chamber or vessel of sufficient size to retain therein the necessary volume of sodium bicarbonate crystals. Near the bottom of this vessel and leading thereinto is a conduit 2 for introducing carbon dioxide. Also near the bottom of the vessel a conduit 3 with suitable pumping means is provided for introducing brine and ammonia. A conduit 4 extends into vessel 1, preferably close to the surface 5 of the slurry through which clear liquor may be withdrawn to be cooled. The other end of conduit 4 is connected to a cooler 6 which in turn is connected with conduit 3 whereby cooled liquor may be reintroduced into the slurry along with the fresh ammonia and brine.

At the top of vessel 1 is an opening 7 through which inert gases and any unreacted carbon dioxide and ammonia may escape into conduit 8. The other end of conduit 8 communicates with a scrubbing tower 9 through port 10. Tower 9 is provided at the top with an inlet 11 through which fresh brine may be introduced, and an exit 12 through which inert gases may pass. At the bottom of tower 9 is an outlet 13 connected to a conduit 14 for leading the brine to inlet conduit 3.

A product withdrawal conduit 15 is located at the base of vessel 1. Associated with conduit 15 is a valve 16 for controlling withdrawal of product.

The volume of slurry maintained during operation of the process must be such as to provide a period of retention of the bicarbonate crystals sufficient for the crystals to settle and grow to a size desired. A size suitable for convenient filtration and washing, for instance, is 40–60 mesh. Any chamber or vessel of adequate size to hold the necessary volume may be employed provided it is constructed of material adapted to withstand corrosive action. Vessels of various shapes may be employed. In like manner, the interior of the vessel may be of varying construction. For example, the interior of the vessel may be provided with a perforated partition for holding the crystals. Reactants, in such an arrangement, would then be introduced beneath the partition and allowed to pass upwardly therethrough. Conduit and valve means would be associated with the partition for withdrawal of crystals as product.

An adequate supply of carbon dioxide is maintained with suitable means provided for feeding it to the reaction vessel. Associated with the feed means may be a carbon dioxide pressure regulator and also preferably a carbon dioxide heater. Introduction of carbon dioxide into the slurry is conducted in such a manner as to obtain a thorough dispersion of the gas therein. This may be accomplished by employing any of various types of available dispersal nozzles.

Rather than being absorbed in a separate preliminary ammoniating step as in the conventional process, the ammonia in the instant invention is introduced separately into the reaction vessel near the bottom thereof in a manner similar to the carbon dioxide. An adequate source of ammonia is maintained and is provided with feed means connecting it to the reaction vessel. Situated in the feed means is an ammonia cooler and pressure regulating means to insure proper control of the feed. As in the case of the carbon dioxide, the ammonia is introduced into the reaction vessel in such a manner as to provide a thorough dispersal of the ammonia in the slurry. Any known type of dispersing means suitable for the dispersing of ammonia may be employed, if desired, in conjunction with the ammonia feed means.

Brine solution for use in this invention may be prepared in any convenient manner, since the preparation thereof forms no part of this invention. Prior to being introduced into the reaction vessel, however, the brine may be first employed, if desired, as a scrubbing agent. In this way it is possible to recover any carbon dioxide and ammonia which may have been carried out by the inert gases which inevitably enter the reaction vessel with the carbon dioxide. After recovery of these gases, the brine, along with any absorbed gases, is led to the reaction vessel. Like the other reactants, it too is fed into the body of slurry near the bottom thereof.

By introducing each reactant into the bottom of the slurry it is possible to continually agitate the crystals of vicarbonate. Agitation thus produced creates a state of suspension in which the crystals are separated from each other. These separated and free crystals then act as seed crystals and can be grown to any desired size by the deposition thereon of the freshly precipitated bicarbonate.

A second important reason for introducing reactants substantially together near the bottom of the body of slurry is the fact that a rapid reaction is thereby obtained. Such a result is not only favored by the introduction of the reactants at substantially the same point, but also because this manner of introduction creates a turbulence which thoroughly disperses the reactants in a relatively large volume. Moreover, the large amount of crystals continually retained serves in a manner similar to the packing in a packed absorption tower. Thereby a high rate of absorption of carbon dioxide and ammonia is obtained. In this manner the rate of conversion of reactants obtained is extremely high with little or no escape of unreacted gaseous reactants.

Clear liquor from the top of the body of slurry is continuously withdrawn and cooled. Preferably, clear liquor alone without crystals is circulated. In this way, the bicarbonate crystals will not be broken through circulation thereof and by their retention in the reaction vessel they can serve as seed crystals and readily grow to the desired size. The withdrawn liquor is passed through suitable cooling means and preferably reintroduced into the reaction vessel near the bottom thereof along with the other reactants. The particular cooling arrangement employed in no way affects the process. It is only necessary that the arrangement employed adequately cool the liquor as required.

Withdrawal of the clear liquor and cooling thereof serves two very important functions. First, it removes the heat of absorption and of crystallization. Thus it provides a method of controlling the temperature within the reaction vessel to the most desirable operating range. This range is approximately 35–40° C. Temperature control may be efficiently accomplished in this manner, since the problem of bicarbonate incrustation found in the conventional process can be easily overcome. By regulating the velocity of the liquor as it passes through the cooler, a turbulence may be created within the cooler of sufficient intensity to nullify the formation of bicarbonate incrustations. Without the continued problem of bicarbonate incrustations, a high heat transfer rate is insured, resulting in effective and simple control of the temperature within the reaction vessel.

Withdrawal and cooling the clear liquor serves the second function of creating a condition favorable to crystallization of the bicarbonate. As this clear liquor is cooled, a supersaturated condition of metastability is created by lowering the temperature of the liquor to about one to two degrees C. above the saturation point. When this supersaturated solution is reintroduced into the body of slurry in the vicinity of the crystals, the crystals, acting as seed, cause immediate precipitation of the bicarbonate in solution. The precipitate thus formed deposits on the separated, free crystals, thus increasing their size.

The application of the process to the apparatus shown on the drawing may, in general, be understood from the description of the drawing. Carbon dioxide, brine, and ammonia are introduced into the vessel through the appropriate feed conduits. While the reactants are being introduced, the outlet valve is maintained in a closed position so as to create a large volume of slurry.

As the reactants are introduced into the vessel, the ammonia and carbon dioxide are absorbed forming ammonia bicarbonate. The latter in turn reacts with the sodium chloride to form sodium bicarbonate and ammonium chloride. To initiate the precipitation and crystal growth of the sodium bicarbonate, crystals of bicarbonate may be placed in the solution.

As the process proceeds, crystals of bicarbonate will gradually settle toward the bottom of the vessel leaving a layer of clear liquor at the top. This liquor is hot as a result of the exothermic reaction and is cooled by being withdrawn from the vessel and passed through cooling means. After being cooled it is reintroduced into the vessel along with the brine and ammonia.

The carbon dioxide employed in bicarbonate manufacture is generally contaminated with inerts such as nitrogen. These will pass upwardly through the slurry and escape. Accompanying these inerts may be small amounts of unreacted ammonia and carbon dioxide. In order that these small amounts of reactants may be recovered, the gases, including the inerts, ammonia and carbon dioxide, are led to a scrubbing tower where they are absorbed by a countercurrently flowing stream of brine. The brine, along with any small amounts of absorbed carbon dioxide and ammonia, is then fed to the appropriate feed conduit for introduction into the reaction vessel.

Operation of the process may be conducted on a continuous or on a batch scale. In the latter case, however, the rate of withdrawal of product and the feed rate of reactants are adjusted with respect to each other so as to retain in the reaction vessel at all times the desired volume of slurry. The sodium bicarbonate crystals contained in the slurry and withdrawn as product are collected as by filtration and washing. These crystals are then dried. The mother liquor recovered from the filtration step is reintroduced into the process.

What we claim is:

1. In a process for producing soda ash in which brine, ammonia and carbon dioxide are reacted to produce sodium bicarbonate, the improvement which comprises: establishing a body of slurry comprising sodium bicarbonate crystals and liquor; feeding brine, ammonia and carbon dioxide into said body of slurry near the bottom thereof; withdrawing from a lower portion of said body of slurry as product a portion of the slurry containing crystals of the desired size; adjusting the feed and withdrawal rates so as to maintain said body of slurry in such volume as to provide a period of retention of each crystal within said body sufficient for each crystal to grow to a size and mass such that it will settle within the body of slurry to the point of product withdrawal; continuously withdrawing clear liquor from the top of said body of slurry, cooling said withdrawn liquor to about one to two degrees centigrade above its saturation point, reintroducing the cool liquor into the body of slurry near the bottom thereof; and regulating the velocity of the flow of said liquor during cooling so as to create a turbulence sufficient to prevent incrusting of the cooling means.

2. A method as defined in claim 1 wherein ammonia-containing gases evolved from the body of slurry are passed in countercurrent contact with the incoming brine solution.

References Cited in the file of this patent

UNITED STATES PATENTS

| | | |
|---|---|---|
| 1,359,097 | Nishigawa | Nov. 16, 1920 |
| 1,704,611 | Jeremaissen | Mar. 5, 1929 |
| 1,814,284 | Burnham | July 14, 1931 |
| 1,880,925 | Eissner | Oct. 4, 1932 |
| 2,164,111 | Jeremaissen | June 27, 1939 |
| 2,164,112 | Jeremaissen | June 27, 1939 |
| 2,219,776 | Henderson | Oct. 29, 1940 |
| 2,527,340 | Taylor | Oct. 24, 1950 |